(No Model.) 3 Sheets—Sheet 1.
J. E. ST. JOHN.
MACHINE FOR GATHERING AND BALING HAY.
No. 483,678. Patented Oct. 4, 1892.
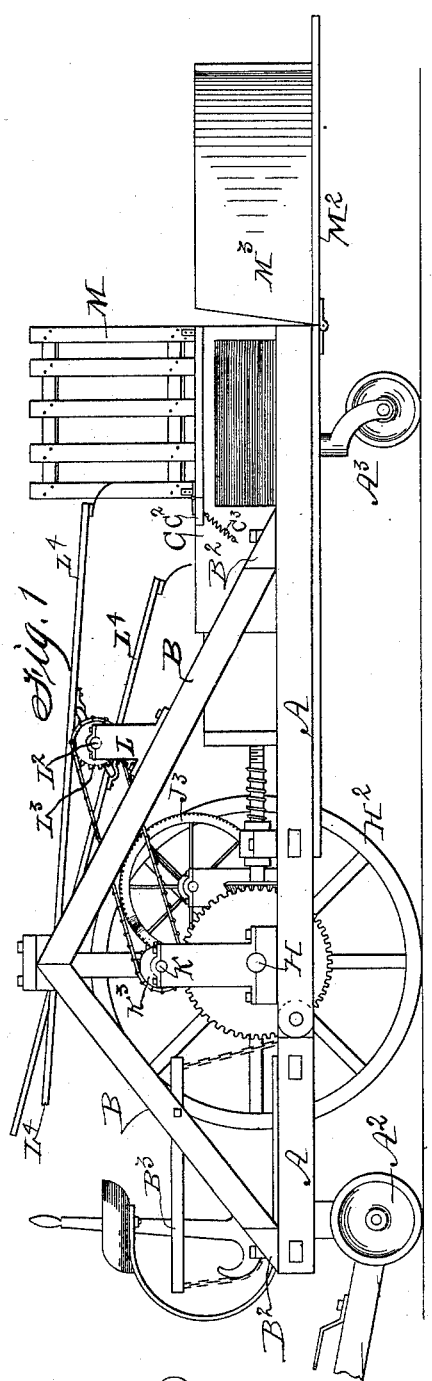
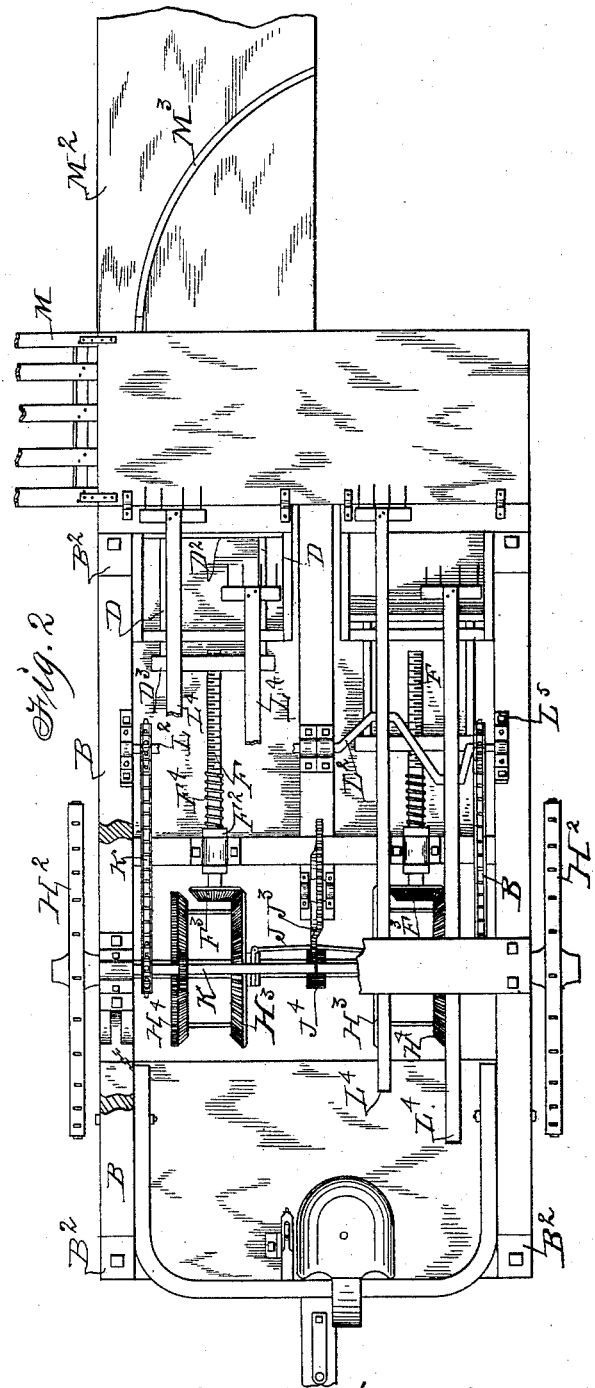

(No Model.) 3 Sheets—Sheet 2.

J. E. ST. JOHN.
MACHINE FOR GATHERING AND BALING HAY.

No. 483,678. Patented Oct. 4, 1892.

Witnesses:
W. J. Sankey.
R. H. Orwig.

Inventor: James E. St John
By Thomas G. Orwig, Attorney (No Model.) 3 Sheets—Sheet 3.
J. E. ST. JOHN.
MACHINE FOR GATHERING AND BALING HAY.
No. 483,678. Patented Oct. 4, 1892.
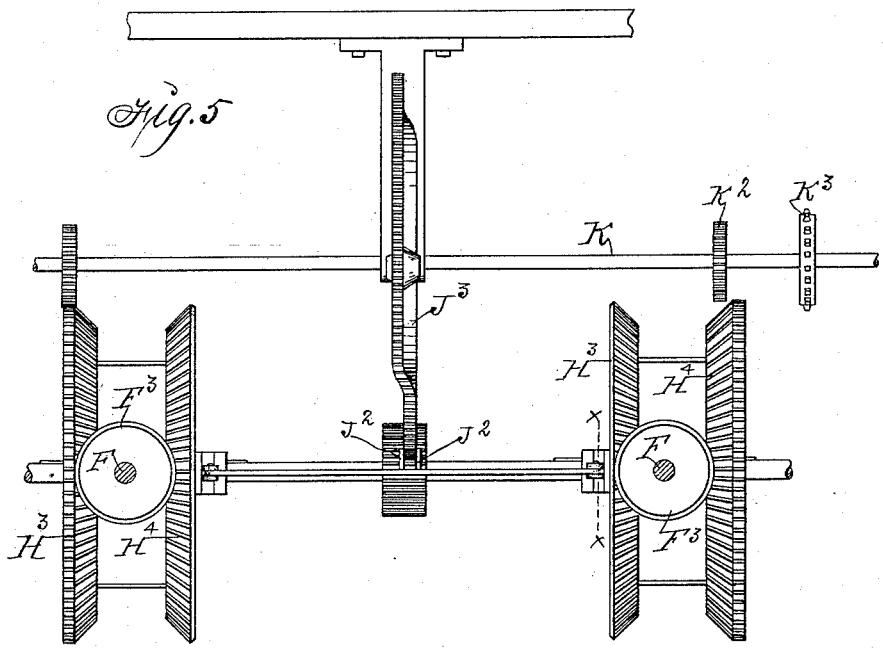
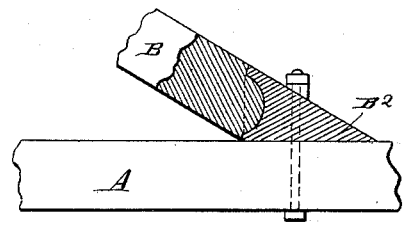
Witnesses:
W. J. Sankey
R. H. Orwig
Inventor: James E. St. John,
By Thomas G. Orwig, Atty.

UNITED STATES PATENT OFFICE.

JAMES E. ST. JOHN, OF HOPEVILLE, ASSIGNOR OF TWO THIRDS TO J. M. JACKSON AND E. F. FREEMAN, OF TINGLEY, IOWA.

MACHINE FOR GATHERING AND BALING HAY.

SPECIFICATION forming part of Letters Patent No. 483,678, dated October 4, 1892.

Application filed September 28, 1891. Serial No. 407,077. (No model.)

*To all whom it may concern:*

Be it known that I, JAMES E. ST. JOHN, a citizen of the United States of America, residing at Hopeville, in the county of Clark and State of Iowa, have invented a new and useful Machine for Gathering and Baling Hay, &c., of which the following is a specification.

My object is to produce a machine adapted to be moved by draft animals and having mechanism mounted thereon actuated by traction-wheels which shall gather the hay, &c., from the field and form it into compact bales while in motion.

My invention consists in combining with a hay-gatherer a machine having one or more hay-presses mounted thereon and adapted to be operated indirectly by means of traction-wheels, the whole to be operated and moved over the field by draft-animals attached to the forward part thereof, and also in the manner of constructing and combining the various operative portions of the machine, as hereinafter set forth, pointed out in the claims, and illustrated in the accompanying drawings, in which—

Figure 3:
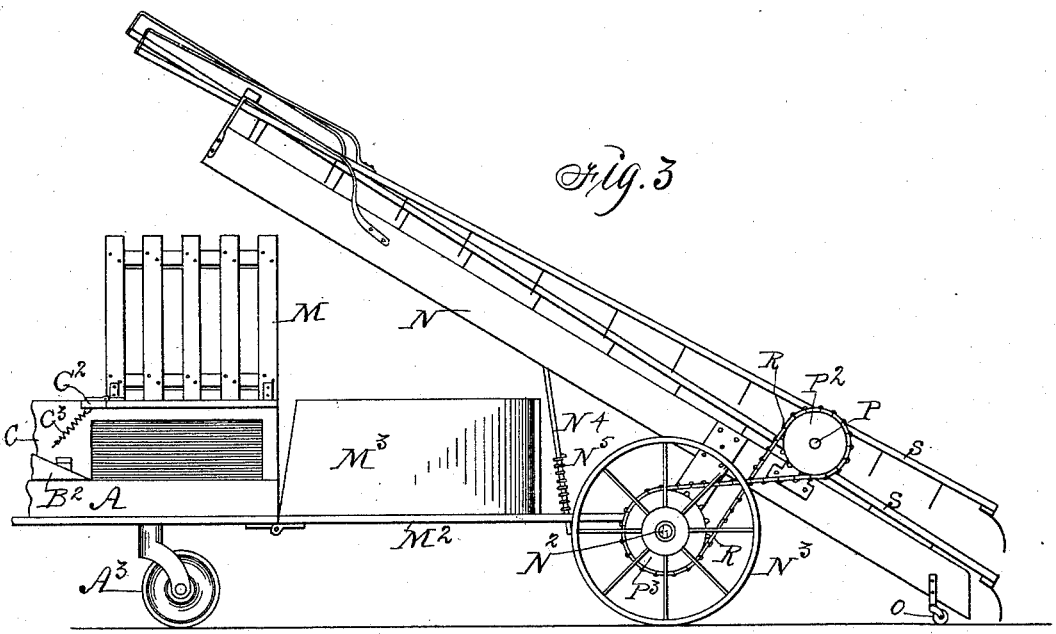
Figure 4:
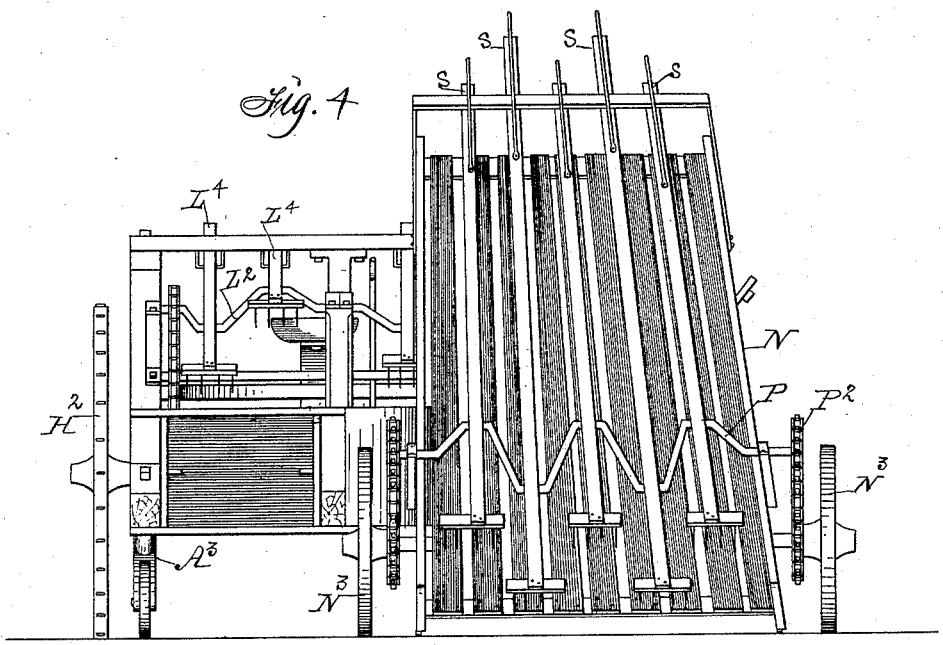

Figure 1 is a side elevation of the complete hay-pressing machine. Fig. 2 is a top or plan view of the hay-pressing machine with portions of the supporting-frame broken away, exposing the presses and their accompanying mechanisms to view. Fig. 3 is a side view of the hay-gathering and part of the hay-pressing machine connected as required in practical use, and Fig. 4 is a rear end view of Fig. 3. Fig. 5 is an enlarged rear detail view of the mechanism for automatically reversing the movement of the followers in the hay-presses. Fig. 6 is a transverse sectional view through the line $x$ $x$ of Fig. 5. Fig. 7 is a detail view, partly in section.

The oblong frame of the hay-pressing device is designated in the accompanying drawings by the letter A and its forward and rear trucks by $A^2$ and $A^3$, respectively. Near its central portion the said oblong frame is jointed, and an arched frame B rests in metal sockets $B^2$, fixed on the sides of the oblong frame, and supports some of the operative parts of the machine, and a compound lever $B^3$ is fulcrumed to the arched frame and connected with the jointed portion of the oblong frame, so that the jointed portion of the latter may be raised by moving the handle of the compound lever. The ends of the arched frame being loose in the sockets $B^2$ allows flexion between the arched frame and the main frame. The boxes C, mounted on a platform on the rear end of the frame A, having their ends and part of their top portions open, are adapted to allow hay to be compressed therein, and on the edge of the top portion of each box is hinged a wooden strip $C^2$, normally held downward by its spring $C^3$, as required, to adapt itself to the inequalities of the hay when it is being forced therein.

D represents a frame in each of the said boxes, having at its one end a follower $D^2$ and at its other end a block $D^3$, provided with a concentric screw-threaded bore.

Two screw-threaded bolts F, having the thread thereof running in opposite directions, are placed in the bearing-blocks $F^2$, which are mounted on a cross-piece of the oblong frame. One end of each bolt is extended through the concentric bore in each of the blocks $D^3$, and its other end has a bevel-wheel $F^3$ fixed thereto. It will now be obvious that the follower $D^2$ will be moved forward when the bevel-wheel $F^3$ is moved in one direction and backward when the movement is reversed. $F^4$ represents a coil-spring placed on each of the bolts F, so that in the event of the block $F^2$ passing the screw-threaded portion of the bolt it will again be engaged by the screw-thread when the motion is reversed.

In the central portion of the oblong frame is an axle H, to the ends of which are fixed traction-wheels $H^2$, and on the said axle on opposite sides of its center are two pairs of bevel-wheels adapted to move longitudinally on the axle and to be rotated thereby, the inner ones of which are designated by the symbol $H^3$, and the outer ones, which are provided with cogs on their peripheries, by the symbol $H^4$. The bevel-wheels $F^3$ are interposed between the wheels $H^3$ and $H^4$, so that moving the latter longitudinally on the axle will cause the motion of the bevel-wheels $F^3$ to be reversed. This movement of the bevel-wheels on the axle H is accomplished automatically by the employment of the following mechanisms: The two pairs of bevel-wheels are connected with each other by means of the rod J, on each end of which is hinged an annular collar adapted to enter a coinciding annular groove on the hub of the bevel-wheel, as clearly illustrated in Figs. 5 and 6, and on the central portion of the rod J are two integral lugs $J^2$. A wave-wheel $J^3$, having bearings in a support projecting from the frame of the machine, as clearly shown in Fig. 1, is provided with cogs on its periphery, as required, to be engaged and operated by a cog-wheel $J^4$ on the axle H, and its outer face is interposed between the lugs $J^2$ on the rod J, so that the said rod is moved laterally when the wave-wheel is rotated.

Two arbors K, each having a cog-wheel $K^2$, adapted to mesh with the cogs on the peripheries of the bevel-wheels $H^4$, and a sprocket-wheel $K^3$, fixed thereto, are pivoted in supports projecting from the frame of the machine, in such a manner that one of the cog-wheels $K^2$ will be in engagement with one of the bevel-wheels $H^4$ at all times, so that they will be alternately rotated thereby.

Fixed to the arched frame B, in the rear of the traction-wheels $H^2$, are bearing-blocks L to support the shafts $L^2$, each of which has two cranks formed therein by being bent outward in reverse ways from its axis. A sprocket-wheel $L^3$ is fixed to each shaft in longitudinal alignment with the sprocket-wheels $K^3$ on the arbors K, and are connected by means of a sprocket-chain, as required, to be rotated thereby, and hinged to each crank in the shaft end $L^2$ is a wooden arm $L^4$, the forward end of which is longitudinally movable in the top of the arched frame B, and its rear end is provided with a fork, so that a rotary movement thereof will force the hay on the rear end of the machine into the boxes C, and it will be seen that the arms on the side of the machine will remain inoperative when the follower in the box C is being advanced and be actuated only when the box is open.

M represents a gate hinged to the side of one of the boxes to prevent the hay from falling off the platform.

$M^2$ represents a platform hinged to the rear end of the hay-pressing machine and provided with a curved guide $M^3$, adapted to direct the bales of hay to the side of the machine, and attached to the rear end of the said platform is a hay-gathering machine adapted to elevate the hay to the top of the hay-pressing machine, and is constructed as follows: A frame N, having a slotted bottom, is mounted on the axle $N^2$ of the wheels $N^3$, which axle is connected with the rear end of the platform M and a rod $N^4$, interposed in a coil-spring $N^5$, the top of which is fixed to the rod, and its bottom, adapted to engage the platform, is attached to the frame and to a part of the platform M, as required, to support the said frame at an angle and allow a limited vertical movement of the same, and caster-wheels O are attached to the rear ends of the frame to elevate it slightly from the ground. A rotatable shaft P, having a plurality of cranks bent in diverse direction from its axis, has bearings on the side of the frame, and sprocket-wheels $P^2$ on its ends are connected with sprocket-wheels $P^3$, fixed to axle by means of sprocket-chains R, to provide means for rotating it.

S represents rake-bars hinged to the cranks in the shaft P and provided with forks on their ends and tines extending downward therefrom along their longitudinal centers, and their tops are connected with a cross-bar of the frame in such a manner as to allow an unrestricted longitudinal movement of the said bars.

In the practical operation of my invention I attach draft-animals to the tongue on the forward part of the machine, and as it passes over the field it will be seen that the hay-gatherer will elevate the hay to the top of the hay-pressing machine, connected with which and actuated by the traction-wheels $H^2$ are means for forcing the hay into the boxes C and for advancing the follower therein, as required, to compress the hay, and the bales in the boxes C may be separated by means of a follower-board of common form and tied by means of any common mechanism adapted for that purpose.

Having thus described my invention, what I claim as new, and desire to secure by Letters Patent, is—

1. The combination, in a hay-baling machine, of an oblong frame jointed in its approximate center, mounted on wheels at its forward and rear ends and provided with two traction-wheels in its approximate center, which traction-wheels are adapted to operate the baling mechanism, an arched frame resting in metal sockets fixed on the sides of the said oblong frame, the said metal sockets, substantially as described, and a lever fulcrumed to the said arched frame and connected with the said jointed portion of the oblong frame, whereby the said traction-wheels may be elevated from the ground, substantially as shown and described.

2. The combination, in a hay-baling machine adapted to be advanced and operated by draft-animals, of two baling-boxes mounted on the machine, two pairs of bevel-wheels mounted on the axle of the traction-wheels of the device, a screw mounted in bearings fixed to a part of the frame and extended through an internally-screw-threaded block connected with a follower or plunger in each of the said boxes, a coil-spring placed on each of the said screws, for the purposes stated, the said screw and follower or plunger, a bevel-wheel on the other end of each of the said bolts, adapted to mesh with either wheel in the said pairs of beveled wheels mounted on the axle of the traction-wheels, and means for automatically moving the said bevel-wheels longitudinally on their axle, substantially as and for the purposes stated.

3. A hay-baling machine adapted to be advanced and operated by draft-animals, consisting of an oblong frame mounted on wheels, two baling-boxes mounted on the said frame, a follower or plunger in each of the said boxes, a screw connected with each of the said followers or plungers, as required to operate them when rotated, a bevel-wheel on the end of each of the said screws, an axle having traction-wheels on its outer ends and two pairs of bevel-wheels fixed thereon, one pair being in juxtaposition to each of the said bevel-wheels, adapted to mesh with them, means for automatically reversing the movement of the bevel-wheels on the ends of the screws, which means comprise a rod having an annular collar on each end adapted to enter a corresponding annular groove formed in the hub of each of the said pairs of bevel-wheels, two lugs projecting upward from the central portion of the said rod, a cog-wheel fixed to the axle of the traction-wheels in juxtaposition to the said lugs, and a wave-wheel having cogs on its periphery adapted to mesh with the cog-wheel on the said axle to be rotated thereby and having bearings in a projection from the frame of the machine and interposed between the lugs on the said rod, substantially in the manner and for the purposes set forth.

4. A machine for gathering and baling hay, comprising an oblong frame supported at its front portion by means of a rotatable axle and a traction-wheel on each end of the axle, two baling-boxes in parallel position on the rear portion of the said frame, a follower in each box connected with a screw extended horizontally and connected with the rotating axle by means of bevel-gears, means for alternately connecting and disconnecting said screws with the said axle, an auxiliary frame or truck at the front end of the main frame, adapted for hitching horses thereto and provided with a hinged connection with the main frame that allows the jointed portion of the said frame to be elevated, a truck at the rear end of the main frame, provided with a hinged connection that allows vertical flexion, a hay-rake and elevator connected with the rear truck to automatically gather and elevate hay to the baling-boxes on the rear part of the main carriage-frame, caster-wheels under the rear part of the main frame, and means for elevating the approximate central portion of the main frame, arranged and combined to operate in the manner set forth, for the purposes stated.

5. In a hay-baling machine adapted to be advanced and operated by draft-animals, and consisting of a frame mounted on wheels, having two baling-boxes mounted thereon adapted to contain hay, straw, &c., the combination of a follower in each of the said boxes, a block connected with the follower, having a screw-threaded bore, a screw-threaded bolt having bearings in frame of the machine and adapted to enter the said bore, a coil-spring on the said bolt between its bearing-block and the screw-threaded portion thereof, for the purposes stated, and means actuated by the traction-wheels of the machine for operating the screw-threaded bolt, as and for the purposes stated.

6. In a hay-baling-machine adapted to be advanced and operated by draft-animals, and consisting of a frame mounted on wheels, having two baling-boxes mounted thereon adapted to contain hay, straw, &c., the combination of a follower in each of the said boxes, a block connected with each follower, having a screw-threaded bore, a screw-threaded bolt having bearings in the frame of the machine adapted to enter the said bore, a bevel-wheel on the opposite end of the bolt, two bevel-wheels adapted to mesh with the bevel-wheel in the bolt and rotate it when moved into engagement therewith, an axle having traction-wheels on its outer ends upon which the said bevel-wheels are fixed and have a longitudinal movement, with means for forcing the hay into the boxes, comprising a crank-shaft, and an arbor having bearings in the arched frame above each of the boxes in which the hay, straw, &c., is placed, a cog-wheel on the arbor adapted to mesh with cogs formed in the periphery of one of the said bevel-wheels when the bevel-wheel is moved on the axle of the traction-wheels into engagement with the said cog-wheel, a sprocket-wheel fixed on the said arbor and connected with a sprocket-wheel on the crank-shaft by means of a sprocket-chain, and one or more arms fixed to the cranks formed in the crank-shaft and having their forward ends extend through loops in the top of the arched frame and their rear ends provided with forks, substantially as shown and described, for the purposes stated.

JAMES E. ST. JOHN.

Witnesses:
W. H. ADKINS,
DANIEL O. BALL.